US012474872B2

(12) United States Patent
Clarke et al.

(10) Patent No.: US 12,474,872 B2
(45) Date of Patent: Nov. 18, 2025

(54) ADVANCED DATA ACCUMULATION FOR IMPROVED WRITE PERFORMANCE

(71) Applicant: Kioxia Corporation, Tokyo (JP)

(72) Inventors: Brian Clarke, Great Missenden (GB); Keigo Honda, Yokohama (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/595,357

(22) Filed: Mar. 4, 2024

(65) Prior Publication Data

US 2025/0278215 A1 Sep. 4, 2025

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| 11,907,568 B2 * | 2/2024 | Jung ...................... G06F 3/064 |
| 12,028,208 B1 * | 7/2024 | Hsiao ...................... G06F 16/26 |
| 2021/0034584 A1 * | 2/2021 | Dalmatov ............ G06F 16/215 |
| 2021/0373804 A1 * | 12/2021 | Gorobets ................ G06F 3/068 |
| 2023/0289078 A1 * | 9/2023 | Wells ..................... G06F 3/0604 |
| 2023/0305748 A1 * | 9/2023 | Ueki ..................... G06F 3/0616 |

* cited by examiner

*Primary Examiner* — Sean D Rossiter
(74) *Attorney, Agent, or Firm* — Foley & Lardner LLP

(57) ABSTRACT

A method performed by a controller of a solid-state drive (SSD), the controller communicatively coupled to a non-volatile semiconductor memory device comprising a plurality of memory dies for storing data. The method comprises receiving a write command containing write data from a host interface. Next, the method comprises determining that write data associated with the write command is on a plurality of data streams. Here each data stream of the plurality of data streams having a stream number. The method then comprises retrieving a fill order from a plurality of fill orders based on a stream number, the fill order specifying a sequence of memory dies of the plurality of memory dies in which to program the write data. Further, the method comprises programming the write data to the memory dies according to the retrieved fill order.

20 Claims, 5 Drawing Sheets

ADVANCED DATA ACCUMULATION FOR IMPROVED WRITE PERFORMANCE

FIELD

The present disclosure relates to solid-state drives (SSD) and methods for writing data to the SSD for more equal command queue depths at the die for improved performance.

BACKGROUND

A solid-state drive (SSD) generally has faster performance, is more compact, and is less sensitive to vibration or physical shock than a magnetic disk drive. Given these advantages, SSDs are being used in more and more computing devices and other consumer products in lieu of or in addition to magnetic disk drives, even though the cost-per-gigabyte storage capacity of SSDs is significantly higher than that of magnetic disk drives. SSDs utilize physical memory cells that comprise non-volatile semiconductor storage devices, such as NAND memory devices, to store data. A system-on-chip (SoC) controller of an SSD manages the transfer of data between a host and the memory cells of the SSD. Writing data to and reading data from the physical memory cells of an SSD typically involves transferring data between a host external to the SSD and the nonvolatile semiconductor storage devices.

A host in communication with the SSD may be running several applications. Each application running in the host can send program commands to the SSD via write streams. An SSD receiving write commands from a given write stream will accumulate write data in internal memory prior to the data being programmed to the NAND memory device. Once a sufficient amount of write data has accumulated, the controller queues the write data via program commands to the memory dies for storage. The controller may logically divide the dies of the NAND memory device into superblocks, and may queue the program commands to a die corresponding to a particular superblock. Each superblock may comprise a plurality of stripes, and the controller may completely program a given stripe of a superblock before it begins to program another stripe of the superblock.

In such systems, the decision of which die to send each program command is made once a sufficient number of commands for programming have been received by the controller. This, however, leads to difficulties in the presence of multiple write streams. In particular, each write stream may be directed to a different superblock, as directing different streams to different superblocks diminishes write amplification and improves the efficiency of garbage collection. However, the write streams may still attempt to access the same memory dies simultaneously. In the presence of insufficient amounts of internal memory, this may lead to collisions between streams. This results in imbalances in die queue depths due to the lack of coordination of die selection between the multiple write streams, and may lead to die starvation and data overflow from the internal memory to the external memory. This reduces overall system efficiency and throughput. The power consumption in processing a write request involving both internal and external memories would also increase. There is therefore a long felt need for a more equal distribution of program commands at the die.

SUMMARY

According to an embodiment of the present disclosure, there is provided a method performed by a controller of a solid-state drive (SSD), the controller communicatively coupled to a non-volatile semiconductor memory device comprising a plurality of memory dies for storing data. The method comprises receiving a write command containing write data from a host interface. Next, the method comprises determining that write data associated with the write command is on a plurality of data streams. Here each data stream of the plurality of data streams having a stream number. The method then comprises retrieving a fill order from a plurality of fill orders based on a stream number, the fill order specifying a sequence of memory dies of the plurality of memory dies in which to program the write data. Further, the method comprises programming the write data to the memory dies according to the retrieved fill order.

According to another embodiment of the present disclosure, there is provided a solid-state drive (SSD). The SSD comprises a non-volatile semiconductor memory device comprising a plurality of memory dies for storing data, and a controller communicatively coupled to the non-volatile semiconductor memory device. Here the controller is configured to receive a write command containing write data from a host interface. The controller then determines that write data associated with the write command is on a plurality of data streams, each data stream of the plurality of data streams having a stream number. Next the controller retrieves a fill order from a plurality of fill orders based on the stream number. Here the fill order specifies a sequence of memory dies of the plurality of memory dies in which to program the write data. The controller then programs the write data to the memory dies according to the retrieved fill order.

In some implementations, the plurality of memory dies in the non-volatile semiconductor memory device are logically organized into a plurality of superblocks each containing a plurality of stripes, and the retrieved fill order is used to program the write data in memory dies of each stripe within each superblock. In certain implementations, the controller retrieves a new fill order from the plurality of fill orders for each superblock. In other implementations, the controller stores the plurality of fill orders in a look up table indexed by stream number. In further implementations, the controller retrieves a fill order from the plurality of fill orders by indexing into the look up table with (i) a stream number, or (ii) a randomly generated number. In some implementations, the controller retrieves a fill order from the plurality of fill orders by using a precomputed rotation of the plurality of fill orders (i) per data stream, or (ii) per stripe, or (iii) per superblock.

In certain implementations, the write data is programmed in full-sequence-program (FSP) units each having an FSP number, and each fill order specifies a memory die for each FSP number, the sequence of memory die in each fill order arranged with increasing FSP number. In other implementations, the memory dies in the sequence are ordered randomly with increasing FSP number. In further implementations, the randomly generated sequence is based on random number generation within the controller. In some implementations, the sequence of memory die with increasing FSP number in each of the fill orders are precomputed at runtime. In certain implementations, the controller programs each FSP unit to the non-volatile semiconductor memory device according to a sequential fill order of increasing die number if the write data is received on a single data stream. In other implementations, a number of the plurality of fill orders stored in the controller corresponds to a maximum number of concurrent data streams supported by the SSD.

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

Figure 1:
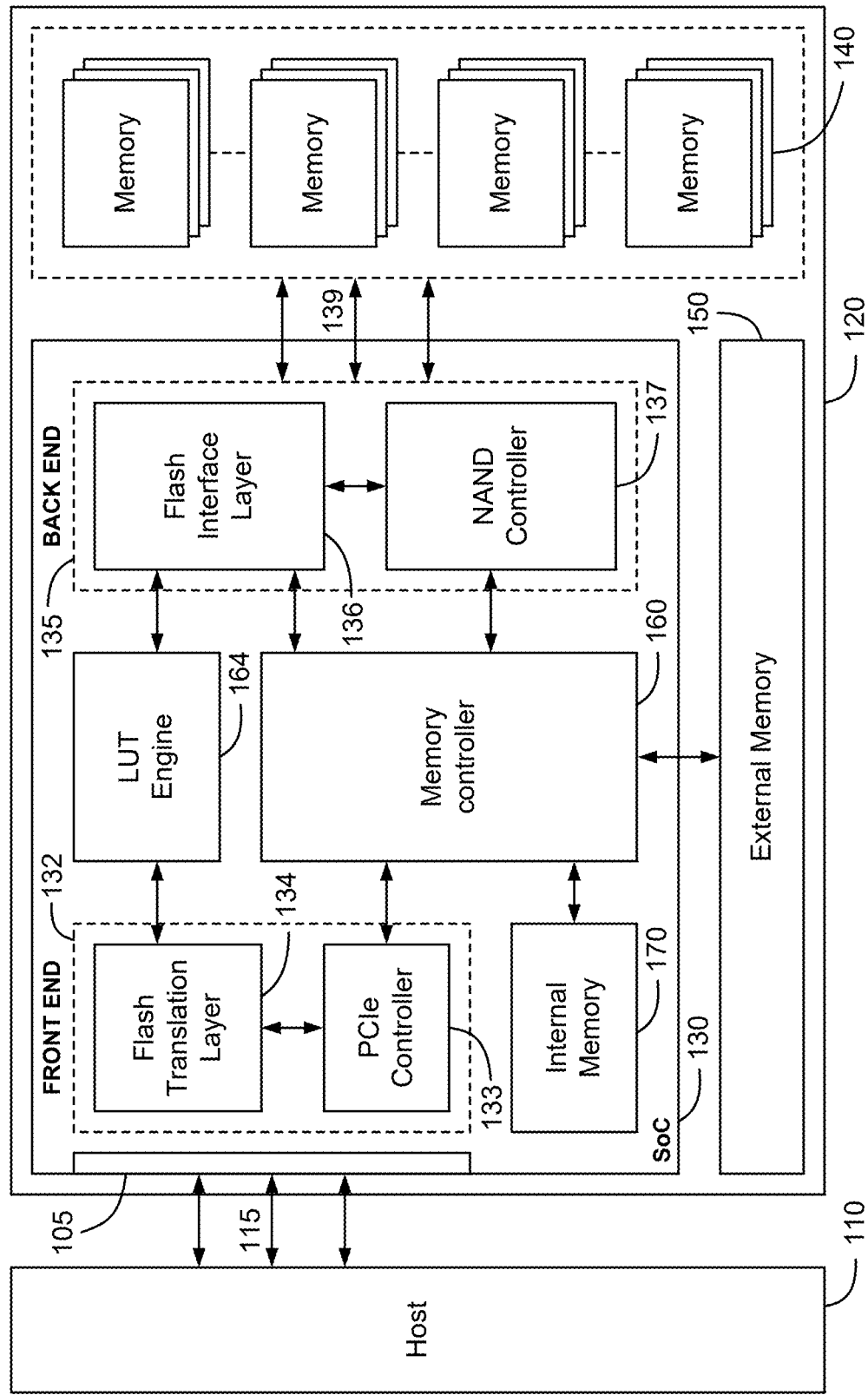
FIG. 1 illustrates a schematic representation of an SSD, configured according to one or more embodiments of the present disclosure.

To provide an overall understanding of the devices described herein, certain illustrative embodiments will be described. Although the embodiments and features described herein are specifically described for use in connection with an SSD having a controller, it will be understood that all the components and other features outlined below may be combined with one another in any suitable manner and may be adapted and applied to other types of SSD memory architectures having a similar need to achieve more equal program command queues at the die when processing host write commands to improve the performance of the SSD, among other benefits readily recognizable by person of ordinary skill in the art.

SSDs with a hybrid memory system configure read and write buffers to consist of a mix of fast memory internal of limited capacity and slower external memory of larger capacity. It is desirable for achieving improved write performance that host write data should always reside within the internal memory without requiring any external memory. To ensure that the write data does not spill over from the internal memory to the external memory, programming of write data to the NAND die should be performed as quickly as possible to avoid bottlenecking at a particular die. In systems with a large write buffer, in memory that does not suffer from performance or power limitations, the core issue of unequal die command queue depths leading to suboptimal utilization of the die program bandwidth in the presence of multiple write streams, is avoided due to every stream having access to enough write buffer to allow the stream, given sufficient host program command queue depth, to queue a program command with a large fraction, or all of the die. Every die will always have a next program command to start as soon as the previous command has completed and thus the die are fully utilized. However, practical systems cannot allocate such a sufficiently large write buffer, due to cost, performance and power limitations, making the techniques described in the present disclosure useful in improving the die utilization and thus overall performance. The present disclosure modifies the order in which die are selected as the target for host write data accumulation based on the write stream identifier associated with the host write command. This achieves more equal program command queue depths at the die for systems where the size of the write buffer (more specifically, internal buffer) is limited. With more equal program command queue depths, the write data will be programmed to the NAND dies without any accumulation in the write buffer caused by bottlenecking at a particular die, thereby minimizing the need for storing the write data in the external buffer.

When there are multiple write streams received from a host, and particularly when the write commands for all streams arrive on the same submission queue, and when the available high-speed memory for write buffer space is relatively small, there can be collisions between write streams such that die are unequally loaded with program commands. This inequality can often get to the point that some die become starved of commands while other die are overloaded with commands. This may result in a significant reduction in overall SSD write performance over that which could be supported by the available NAND dies under equally loaded conditions.

Typically, a block from each die in the SSD is included in a superblock, which uses parity calculated across the die for error detection and correction. There are as many superblocks in the SSD as there are blocks within a die. Each block contains multiple pages that hold data. For TLC NAND devices, 3 pages must be programmed as a full-sequence-program (FSP) unit, whereas for QLC NAND it is 4 pages that form a FSP unit. The number of pages in each block divided by the number of pages in a FSP gives the number of stripes in each superblock. The choice of the order in which to target the die in a stripe for filling with host write data is typically a predetermined simple increment across the die in the stripe. For example, the first FSP unit of program data will be sent to a first NAND die, the second FSP unit of program data will be sent to the second NAND die, and so on.

Each write stream is independent as much as is practical within the SSD in order to maintain separation of data for good garbage collection performance and low write amplification. Each write stream therefore targets a separate open or available superblock with its write commands and thus the assignment of in-flight host write data to NAND die pages is local to the write stream and its superblock. Notwithstanding, streams share the available total memory space available for write buffers. There is no coordination between streams as to which die are being targeted by program commands, especially due to each stream being associated with a separate open superblock. This leads to unequal program queue depths at the die as the program commands for a chosen target die collide, thus leading to the aggregate performance achieved within the SSD being significantly below that possible with a single stream of writes.

The present disclosure mitigates collisions of program commands at a particular die by dynamically modifying the order in which die are picked for FSP unit accumulation across a stripe based on the stream identifier associated with the write command from the host that contributed the data to be accumulated to the FSP unit. This modification seeks to disrupt any coherence between a stream and the choice of die to fill at any particular time, thus spreading the active NAND program commands across a greater proportion of the die and thus achieve higher and more consistent performance.

The present disclosure provides a method performed by a controller of a solid-state drive (SSD). The controller is communicatively coupled to a non-volatile semiconductor memory device comprising a plurality of memory dies for storing data. The method comprises receiving a write command containing write data from a host interface. The method then comprises determining that write data associated with the write command is on a plurality of data streams. Here, each data stream of the plurality of data streams has a stream number. Next, the method comprises retrieving a fill order from a plurality of fill orders based on a stream number. The fill order specifies a sequence of memory dies of the plurality of memory dies in which to program the write data. The controller then programs the write data to the memory dies according to the retrieved fill order.

FIG. 1 is a block diagram of a memory system 100 comprising at least one host 110 in communication with a storage device 120 such as solid-state drive (SSD). The host 110 is a computing system that comprises processors, memories, and other components as is generally known in the art, and which is not shown in FIG. 1 for the sake of brevity. The host 110 sends write data to or retrieves read data from storage device 120 via host interface 105. Such communication is done through data streams 115. Each data stream may be specific to an application run on the host 110 and may have a unique stream identifier. Storage device 120 provides non-volatile storage and retrieval functionality for use by the host 110. Storage device 120 may include an integrated circuit comprising a controller communicatively coupled to a memory array. Such an integrated circuit may comprise a system-on-chip (SoC) 130. SoCs are advantageous as they provide a single integrated circuit that contains circuitry and components of the electronic system for the storage device 120 to function.

SoC 130 may be communicatively coupled to a memory 140. Data may be transferred between SoC 130 and memory 140 via channels 139. Each channel 139 carries commands and data between SoC 130 and memory 140. Each channel 139 may be associated with a data stream 115 from host 110. Memory 140 may comprise an array of NAND semiconductor memory, such as a NAND based flash memory device. The memory 140 may be organized into pages, blocks, clusters, planes, die and chips. Memory 140 may comprise a plurality of NAND chips, such as, for example, 32, 64, 128, 256 separate NAND chips, and each NAND chip may be running separate read or write commands on individual die (not shown) within the chip. In the case of write commands, for example, the lack of coordination between streams 115 and channels 139 in respect of which dies in memory 140 are targeted by program commands leads to unequal program queue depths at the die as the chosen targets for programs collide. This causes the aggregate performance of the SSD 120 to be significantly below that which is possible with a single stream of write commands.

Storage device 120 may include a memory external to the SoC 130, such as a dynamic random access memory ("DRAM") 150. However, a person of ordinary skill in the art would understand that other types of external memory such as static random access memory ("SRAM") or other suitable alternatives can be employed without departing from the scope of the present disclosure. External memory 150 comprises several buffers used to temporarily store data during read and write operations between the host 110 and the memory 140 when memory internal to the SoC 130 does not have capacity to hold any more data. However, the external memory 150 is slower than the internal memory 170, and thus use of the external memory 150 generally leads to a large reduction in performance.

Also shown in FIG. 1 is a memory controller 160 that enables the storage device 120 to perform various functions such as processing of read and write commands received from the host 110 as well as internal NVMe™ commands generated within the storage device 120 to maintain functionality. The storage device 120 may include a Read-Only Memory (ROM) that stores firmware for the operation of various states of the storage device 120. The firmware comprises computer executable instructions that are executed by the controller 160 for operation of the storage device 120. The storage device 120 also includes an internal memory 170, such as a static random access memory ("SRAM"), for example, which forms part of the same integrated circuit as the SoC 130. The internal memory 170 may be configured to store operational data such system metadata, mapping tables, NAND read-out rates, as well as data received from host 110 responsive to a host write command.

SoC 130 may comprise a front end host interface 132 which enables communication with the host 110 for the receipt of I/O commands such as write commands. Additionally, storage device 120 may include a back end memory interface 136 for communication with the memory 140 through the plurality of channels 139. Front end host interface 132 on the SoC 130 may comprise a Serial Advanced Technology Attachment (SATA) connector or a NVMe™ connector (NVMe™ is an acronym for "NVM express," where "NVM" stands for "nonvolatile memory") operating with a PCIe™ ("Peripheral Component Interface Express") controller 133 and bus, for example. The PCIe™ controller 133 enables data transfer between host 110 and storage device 120 via data streams 115 at a particular data transfer rate. PCIe™ controller 133 facilitates the transfer of data from the data streams 115 received from host 110 in response to a write command to internal memory 170. The front end host interface 132 may also comprise an NVMe™ buffer manager which includes a flash translation layer (FTL) 134 that enables the SoC controller 130 to perform various activities that facilitate the processing of data received from the host 110, such as, for example, translating an LBA specified by host 110 in a write command to a physical block address in the NAND memory 140. FTL 134 parses logical addressing information contained in the host command for translation into physical address information for accessing the NAND memory 140. PCIe™ controller 133 facilitates storage of data from host 110 to NAND memory 140 in response to write requests from host 110.

Back end memory interface circuitry 135 may comprise an Open NAND Flash Interface (ONFI) or a manufacturer's proprietary interface, for example. Back end circuitry 135 may comprise, for example, an interface according to, but not limited to: a Double Data Rate (DDR) memory bus standard such as DDR3, DDR4 or DDR5, a Low Power Double Data rate (LPDDR) memory bus standard such as LPDDR3, LPDDR4 or LPDDR5; a Hybrid Memory Cube (HMC) memory bus standard. Back end circuitry 135 includes a flash interface layer (FIL) 136 in communication with a NAND controller 137. NAND controller 137 interacts with NAND memory 140 via data channels 139. In some implementations, FIL 136 communicates with a LUT engine 164 in SoC 130 to facilitate the processing of read and write commands received from host 110. When processing write requests, for example, a logical block address (LBA) specified by the host 110 in the write command is used to index into a logical-to-physical look up table (LUT) in LUT engine 164. The LUT engine 164 then provides to FIL 136 a physical block or cluster address in the NAND memory 140 to which the write data is to be stored. FIL 136 provides this physical address to the NAND controller 137 which then issues low-level commands via data channels 139 to specific die in NAND memory 140 for programming the write data.

It should be understood that the write buffer that is used to hold write data received from host 110, as referred to herein, may comprise a combination of at least a portion of internal memory 170 and, optionally, at least a portion of external memory 150. External memory 150 has a small bandwidth, is larger in capacity, and slower at data transfer than internal memory 170. With a limited and relatively small amount of fast internal memory 170 available to hold write data received from host 110 prior to storage in memory 140, performance can be improved if no collision of write commands occurs at the target NAND die in memory 140. Such collisions would result in unequal queue depts at the target NAND die causing write data to be written slowly, which in turn would result in the external memory 150 being used to hold spill-over write data when the internal memory 170 reaches capacity.

Figure 2:
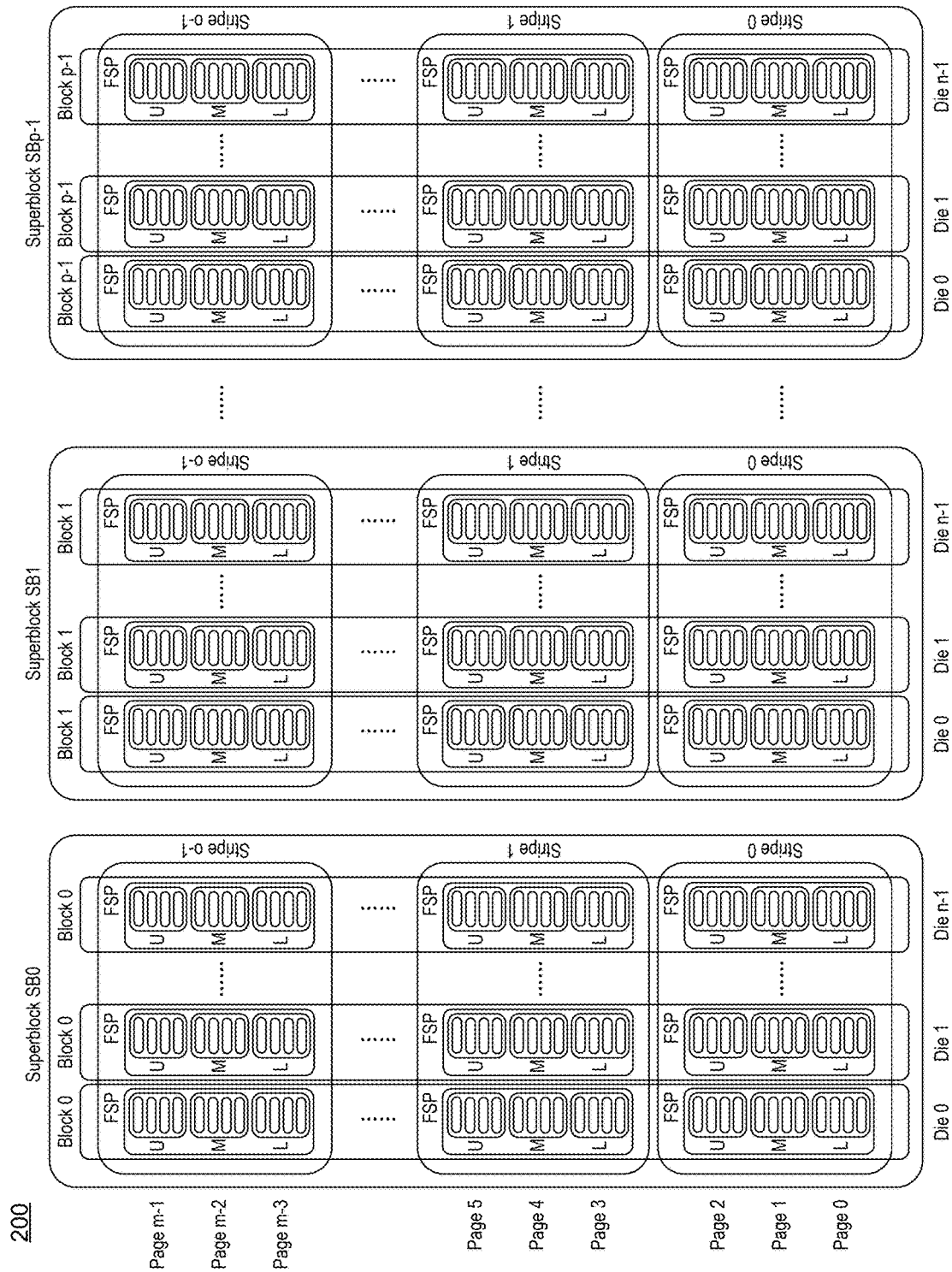
FIG. 2 illustrates a logical organizational representation of the NAND dies in the memory device of the SSD in FIG. 1.

FIG. 2 illustrates a logical organizational structure 200 of the NAND dies in memory device 140. Typically, a block (0, 1, . . . , p−1) from each die (0, 1, . . . , n−1) in memory device 140 is included in a superblock (SB0, SB1, . . . , SBp−1). Each superblock (SB0, SB1, . . . , SBp−1) may also use parity calculated across the dies for error detection and correction. As shown in FIG. 2, there are as many superblocks in memory device 140 as there are blocks within a die. Each block (0, 1, . . . , p−1) contains multiple pages (m−1, m−2, . . . , m−3) that hold data. For TLC NAND devices, 3 pages must be programed as a unit, whereas for QLC NAND 4 pages form a program unit. In the present disclosure the term full-sequence-program (FSP) is used to refer to these program-units. The exemplary organization structure 200 in FIG. 2 shows TLC NAND having upper 'U', middle 'M' and lower 'L' pages. It should be understood that the number of pages in each block divided by the number of pages in a FSP gives the number of stripes (0, 1, . . . , o−1) in each superblock. The choice of the order in which to target the die in a stripe for filling with host write data is usually a predetermined simple increment across the die in the stripe (i.e. the first FSP of write data to be programed will be sent to Die 0, second FSP of program data will be sent to Die 1, etc.).

Each write stream 115 is independent as much as is practical within the SSD 120 in order to maintain separation of data for good garbage collection performance and low write amplification. To this end, each write stream targets 115 a separate open superblock (SB0, SB1, . . . , SBp−1) with its write commands and thus the assignment of in-flight host write data to NAND die pages (m−3, m−4, . . . , m−5) is local to the write stream and its superblock. Data streams 115 share the available total memory space available for write buffers. Open superblocks in NAND memory 140 are superblocks that have not been filled with data.

The write buffer is sized to achieve good write performance when host write streams 115 are not supported and where small data size is preferred due to limited availability of high-speed internal memory 170. This minimizes the use of slower-speed external memory 150 in the write buffer. This also minimizes the number of power-loss-protector capacitors in SSD 120. Because of these limitations, each stream 115 in a multiple-stream supporting SSD 120 has access to only a small portion of the total write buffer. This small portion of the total write buffer can only accommodate in-flight host write data for a small number of FSPs and hence a small number of NAND die program commands for each stream 115. Further, due to each stream being associated with a separate open superblock as described above, there is no coordination between data streams as to which die are targeted by the respective program commands. This results in unequal program queue depths at the die as the chosen targets for programs collide. When this happens, some NAND die are unequally loaded with program commands leading to some die becoming starved. This leads to the aggregate performance achieved being significantly below that which is possible with a single stream of write commands.

According to embodiments of the present disclosure, the order in which die are selected for FSP accumulation across a stripe in NAND memory 140 is dynamically modified. The order of die selection may be based on a write data stream identifier associated with the write command received from host 110 that contributed to the data being accumulated to the FSP. By managing the order in which die are selected during programing of data in the NAND memory 140, the write command collisions at a target NAND die can be mitigated. In this manner, any coherence between the choice of NAND die of a stream to fill at any particular time is disrupted, thereby spreading the active NAND program commands across a greater proportion of the NAND die to achieve higher and more consistent performance.

The present disclosure presents various schemes in which the controller makes the next die choice when processing write commands so that there is a more equal distribution of program commands across all dies in the NAND memory 140. According to an embodiment of the present disclosure, a random number generator may be used to select a die filling sequence or fill order for a write data stream. In some implementations, a new fill order may be generated every time a new stripe is opened in the NAND memory to be filled or programmed with write data. In other implementations, a new fill order may be generated every time a new superblock is opened for writing data, and that fill order is used for filling all stripes within the superblock. In further implementations, a new fill order may be generated for each write data stream 115 received from the host 110. The fill order may be used for all stripes of all superblocks written with data from that write data stream 115.

However, without dedicated hardware support, generating random numbers at runtime to create a die fill order may be expensive in terms of time and power. An alternative approach to using a random number generator to generate a die fill order may be to rely on a collection of precomputed fill orders across the die that may be used at runtime. The collection of precomputed fill orders may be stored in the SSD 120, such as in internal memory 170, for example. Various schemes may be adopted for mapping the precomputed fill orders to stripes as the stripes are opened for writing host data. These schemes may essentially mirror those described above for runtime generated fill orders, but instead of randomly generating the whole fill order, a random selection of which precomputed fill order is to be selected is made. If access to random number generation at runtime is not available, then a fixed rotation of the collection of fill orders may be used. In some implementations, a precomputed rotation order per-stream may be used.

Notwithstanding the above, according to an embodiment of the present disclosure, the simplest solution may be to use a set of precomputed fill orders each having a size that corresponds to a maximum number of concurrent write streams 115 supported by the SSD 120. The collection of precomputed fill orders may be indexed by the stream identifiers to select a fill order for each stripe of a superblock written by a write data stream.

However, through modelling it has been observed that using non-sequential die fill ordering when write streams are not in use by the host can have a detrimental effect on performance. This is because an SSD 120 generally has several channels 139 upon which NAND die reside and which carry the commands and data between SoC 130 and NAND memory 140. The sequential filling order will be arranged to stripe across the channels 139 minimizing blocking due to trying to access die on the same channel simultaneously. Using a random fill order can cause such blockage for program commands and also when the data is later read back from the device 140. According to an embodiment of the present disclosure, a simple sequential fill order is used when multiple write streams are not in use. Further, if channels in the fill order in a particular stream are distributed, blocking on reads can be minimized. To achieve this, periodic channel fill constraints can be defined independently for each stream, and a randomized fill order to the die can be defined under these constraints. Such constraints eliminate blocking caused by simultaneous access to dies on the same channel 139.

The disclosure above relates to generating a fill order when processing host writes. A similar issue of program command collision at the NAND die can arise due to the program commands that result from reclaim writes. Reclaim is the process whereby data from partially valid superblocks is compacted into a smaller number of fully valid superblocks in order to create free space within the NAND memory 140 for further host writes. The reclaim write data fills FSPs and results in NAND program commands in a similar way to host write data. The filled FSPs target different superblocks similar to the host program commands. Thus, there can be collisions between host program commands and reclaim program commands at the die. If all host streams are using a non-sequential FSP fill order there is nothing to be gained by using a non-sequential fill order for reclaim writes. Thus, according to embodiments of the present disclosure, if the non-stream host fill order is sequential (as described earlier to improve non-stream performance) then utilizing a non-sequential FSP fill order for reclaim can mitigate these collisions and improve performance.

Generating fill orders via random number generation may be replaced by other schemes which may produce sequences that provide a better inter-stream de-coherence effect while improving the intra-stream collisions caused by targeting die on the same NAND channel for program data transfer too close together in time.

Figure 3:
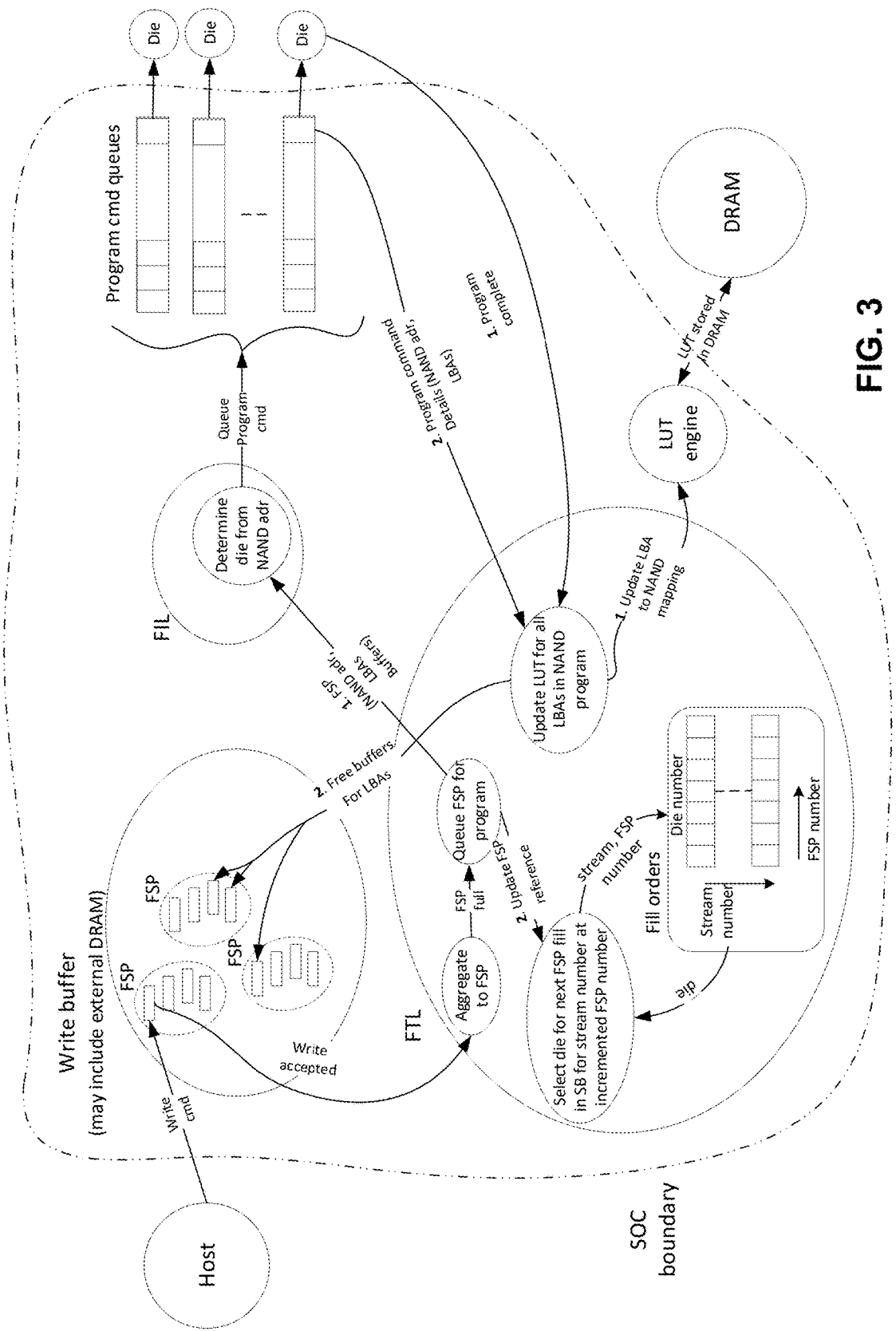
FIG. 3 illustrates an exemplary sequence of programing the memory device of the SSD in FIG. 1, according to one or more embodiments of the present disclosure.

FIG. 3 is an exemplary sequence 300 of programing the NAND memory 140. A typical write program sequence is indicated by process steps having reference numeral "1". Here, the write request is received from host 110 via a data stream 115. The host write request specifies a starting LBA together with a length describing for how many sequential blocks the host is writing data. Each data stream received from host 110 may have a stream identifier. The write data is stored in internal memory 170 until the FSPs for the type of NAND devices in memory 140 are full (e.g. 3 pages of data for TLC NAND). When each FSP in the internal memory 170 is filled, NAND controller 137 queues a program command on a channel 139 for writing the FSP data to the target die. The choice of the order in which to target the die in a stripe for filling with host write data is usually a predetermined simple increment across the die in the stripe. Once the FSP data is programmed, the LUT engine 164 updates the LBA to NAND physical address table. However, such sequential fill orders are prone to program commands colliding at some NAND die leaving other NAND die starved of program commands.

According to embodiments of the present disclosure, a precomputed fill order per data stream received from host 110 is used to program write data to NAND memory 140, as indicated by additional process steps having reference numeral "2" in FIG. 3. In this case, a collection of precomputed fill orders is stored in the SSD 120 in the form of a look-up table (hereinafter fill order table). The fill order table may be stored in the internal memory 170, for example. Each precomputed fill order in the fill order table contains a sequence of dies in NAND memory 140 with which to program with write data. The sequence of dies ensures that the queue depth for all dies in the NAND memory 140 are similar so that all dies are equally used to store host data and no dies are starved of data. Once the FSPs are filled with write data, a FSP identifier and/or a stream identifier is used to index into the fill order table to obtain a precomputed fill order. The NAND controller 137 then queues a program command on a channel 139 for writing the FSP data to the die as stipulated in the precomputed fill order. Once the FSP data is programmed, the LUT engine 164 updates the LBA to NAND physical address table.

Figure 4:
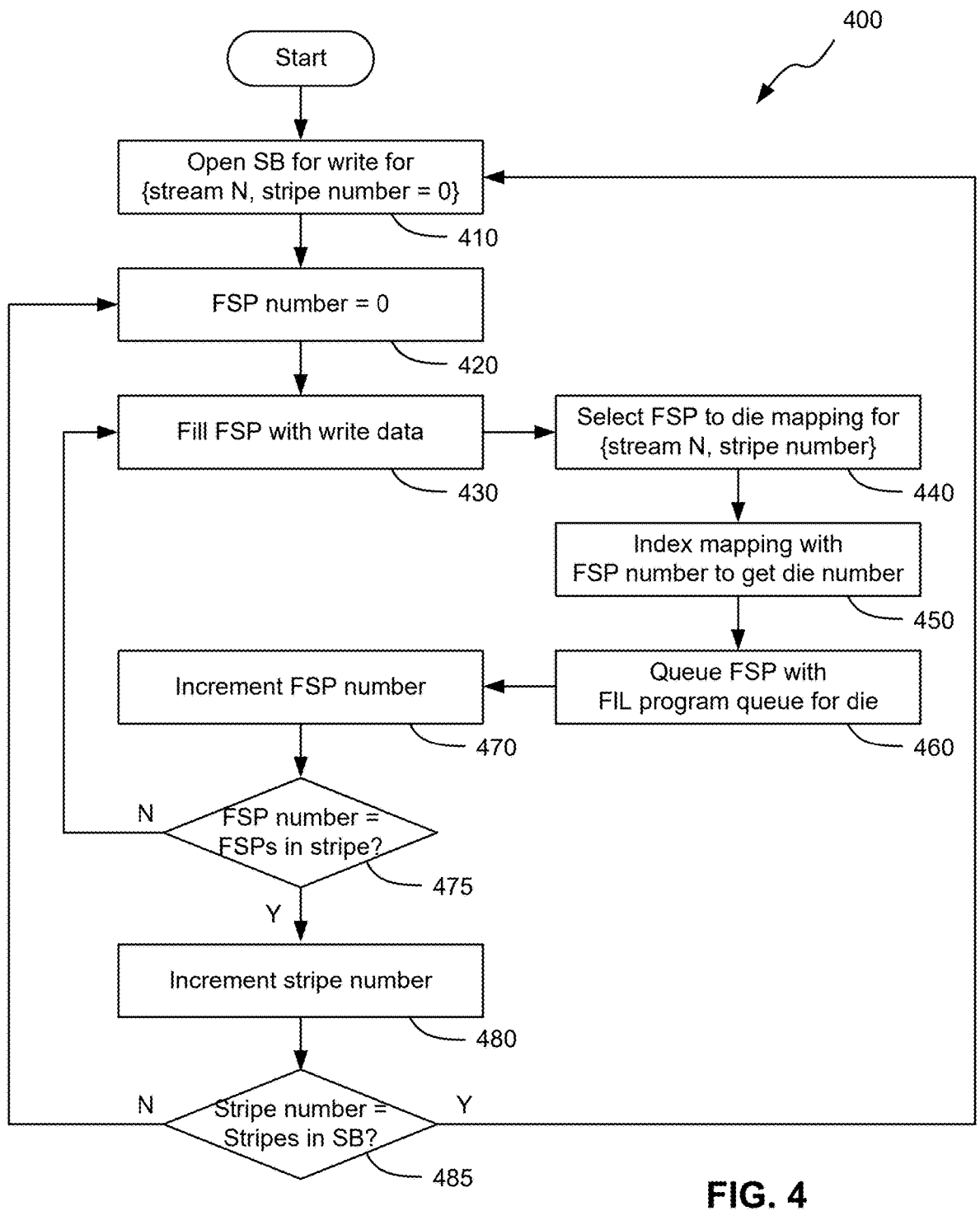
FIG. 4 is a flow diagram of a method for processing a host write command by using fill order sequences to write data to the NAND dies, according to one or more embodiments of the present disclosure.

FIG. 4 illustrates an exemplary flow diagram of a method 400 of processing a write command received by SSD 120 from host 110, according to an embodiment of the present disclosure. Method 400 dynamically modifies the order in which die are picked for FSP accumulation across a stripe in NAND memory 140 based on the stream identifier associated with the host write command that contributed the data to be accumulated to the FSP. In this manner, the active NAND program commands are spread across a greater proportion of the die, thereby achieving higher and more consistent performance.

Each host data stream 115 received by the SSD 120 targets a separate open superblock within NAND memory 140 in which to program write data. Method 400 begins at step 410 where controller 160 opens a superblock in NAND memory 140 for host data stream N. Each superblock has a plurality of stripes. When the superblock is opened for programing write data, the data is written to the NAND die starting at stripe number '0'. The stripe number is incremented as more data from stream N gets programmed. Each stripe contains a plurality of FSPs. Data is stored in the FSPs starting at FSP number '0' (step 420). The FSPs in the write buffer are filled with write data from the data stream 115 (step 430). The write buffer primarily comprises the internal memory 170 and may include external memory 150 if the internal memory 170 does not have sufficient capacity.

The controller 160 then selects a fill order from the LUT containing the collections of precomputed fill orders. Here the fill order may be obtained by indexing into the LUT with the stream identifier N and/or the stripe number (step 440). The fill order comprises of the sequence of programing the FSPs to the dies in NAND memory 140. Specifically, the fill order is indexed with the FSP number to obtain the die number to which the data contained in the FSP is to be written (step 450). The FSP is then queued in the program queue of FIL 136 for programming to the NAND memory 140 using channels 139 (step 460). The FSP number is then incremented at step 470 and the controller 160 determines if the FSP number has reached the maximum in the stripe (step 475). If not ('N' at step 475), the method repeats steps 430-470. If yes ('Y' at step 475), the stripe number is incremented at step 480. The controller 160 determines if the stripe number has reached the maximum in the superblock (step 485). If not ('N' at step 485), the method repeats steps 420-480. If yes ('Y' at step 485), the controller opens a new superblock for a new write data stream at step 410.

Figure 5A:
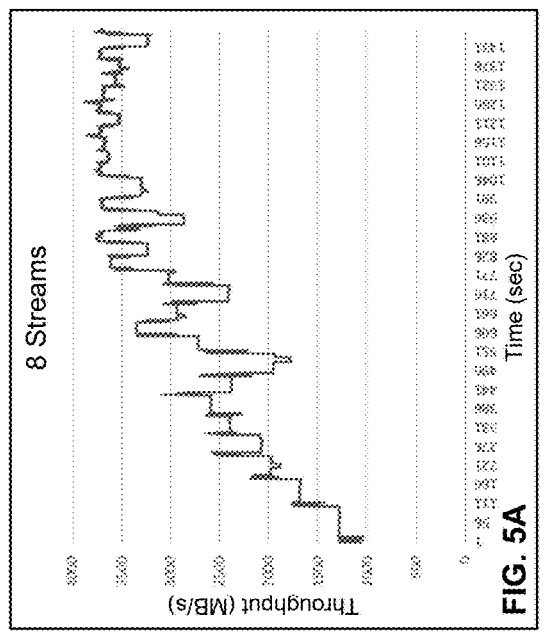
FIGS. 5A and 5B provide exemplary comparative performance data of the SSD in FIG. 1 using a normal sequential fill sequence and a precomputed random fill sequence according to one or more embodiments of the present disclosure, performance data for both fill sequences shown for 8 host data streams.
Figure 5B:
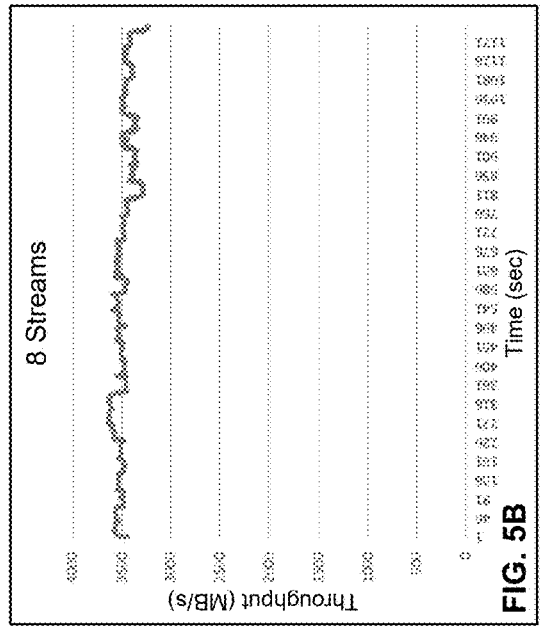

FIGS. 5A and 5B show the modelled throughput from running multi-stream tests with all data on the same submission queue with unlimited rate sequential write traffic with a practically sized write buffer. FIG. 5A shows the variation of throughput for 8 host write streams using a normal sequential fill sequence and FIG. 5B shows the variation of throughput for 8 streams using a precomputed fill sequence according to embodiments of the present disclosure. The fill sequence in the case of FIG. 5B is selected randomly from a collections of precomputed fill sequences as described above. As can be seen in FIG. 5A, the throughput varies with time for programing write streams using the normal sequential fill sequence. This is collisions of program queues at the die caused by unequal program queues at the NAND memory device 140. However, the throughput is effectively constant when using the precomputed fill sequence. In this case, there are no collisions at the die as precomputed fill orders are used to equalize program queues at the NAND memory device 140. Further, the jitter in throughout is also minimized when using the precomputed fill sequence for programing write data.

Figure 6A:
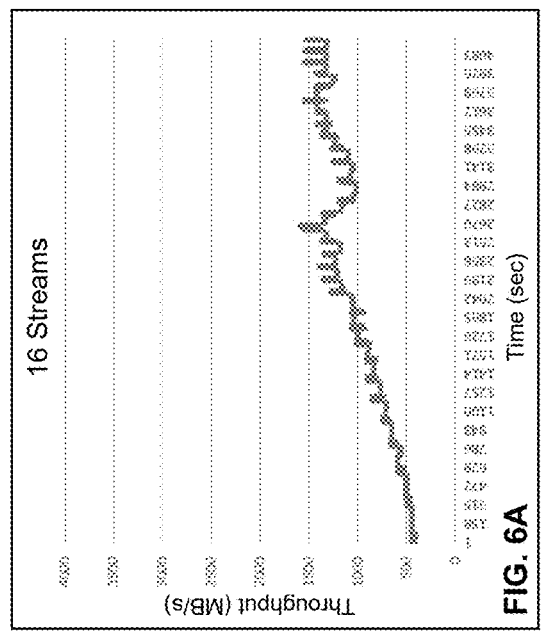
FIGS. 6A and 6B provide exemplary comparative performance data of the SSD in FIG. 1 using a normal sequential fill sequence and a precomputed random fill sequence according to one or more embodiments of the present disclosure, performance data for both fill sequences shown for 16 host data streams.
Figure 6B:
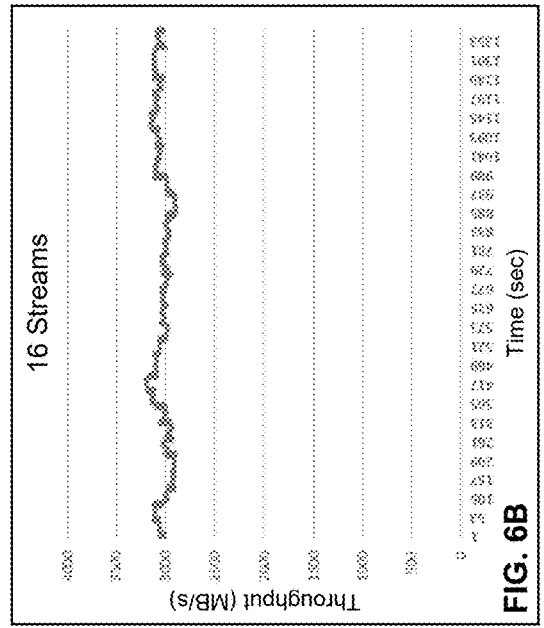

FIGS. 6A and 6B is similar to FIGS. 5A and 5B, shown for 16 host write streams. FIG. 6A shows the variation of throughput for 16 streams using a normal sequential fill sequence and FIG. 6B shows the variation of throughput for 16 streams using a precomputed fill sequence according to embodiments of the present disclosure. The fill sequence in the case of FIG. 6B is selected randomly from a collections of precomputed fill sequences. As with FIG. 5A, the throughput in FIG. 6B varies for with time when programing write streams using the normal sequential fill sequence. However, the throughput is effectively constant when using the precomputed fill sequence. Further, the jitter in throughout is also minimized when using the precomputed fill sequence for programing write data. Notably, the maximum throughput obtained in FIGS. 6A and 6B is lower than that shown in FIGS. 5A and 5B. This is due to collisions of program commands at the NAND die as the number of streams in FIGS. 6A and 6B have doubled from that used in FIGS. 5A and 5B.

As seen in the foregoing, by modifying the fill queue sequence, collisions of program commands at the NAND die are mitigated. Such a modification disrupts any coherence between the choice of die of a stream to fill at any particular time, thus spreading the active NAND program commands across a greater proportion of the die, leading to higher and more consistent performance in the NAND memory device.

In the foregoing, all recitation of "manager" and "engine" should be taken to mean a plurality of circuits within the controller that facilitates the function as described. Such circuits may comprise electronic components formed on a semiconductor chip, such as, for example, transistors and resistors. It should be noted that the term "about" or "approximately" in the foregoing indicates a range of ±20% of the stated value. Additionally, in the foregoing, all recitation of "command," "action," "operation" or "function" should be taken to be based on algorithms and instructions stored on a non-transitory computer-readable medium, that, when executed by a processor, causes a controller of an integrated circuit of a solid-stated drive (SSD) to perform the command, action, operation or function. All recitation of "device," "memory" and "array" are used interchangeably when used in relation to the NAND non-volatile semiconductor memory device. The term "similar" as used herein indicates close to identical but for a stated difference.

Other objects, advantages and embodiments of the various aspects of the present invention will be apparent to those who are skilled in the field of the invention and are within the scope of the description and the accompanying drawings. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method performed by a controller of a solid-state drive (SSD), the controller communicatively coupled to a non-volatile semiconductor memory device comprising a plurality of memory dies for storing data, the method comprising:
receiving one or more write commands containing write data from a host interface;
determining that write data associated with the one or more write commands is on a plurality of data streams, each data stream of the plurality of data streams having a stream number,
identifying, in connection with processing the one or more write commands, a given stream of the plurality of streams having a corresponding stream number;
retrieving a fill order from a plurality of fill orders based on the corresponding stream number, the fill order specifying a sequence of memory dies of the plurality of memory dies in which to program the write data; and
programming the write data to the memory dies in the sequence specified by the retrieved fill order.

2. The method of claim 1, wherein the plurality of memory dies in the non-volatile semiconductor memory device are logically organized into a plurality of superblocks each containing a plurality of stripes, and the retrieved fill order is used to program the write data in memory dies of each stripe within each superblock.

3. The method of claim 2, further comprising:
retrieving a new fill order from the plurality of fill orders for each superblock.

4. The method of claim 2, further comprising:
retrieving a fill order from the plurality of fill orders by using a precomputed rotation of the plurality of fill orders (i) per data stream, or (ii) per stripe, or (iii) per superblock.

5. The method of claim 1, wherein
the write data is programmed in full-sequence-program (FSP) units each having an FSP number, and
each fill order specifies a memory die for each FSP number, the sequence of memory die in each fill order arranged with increasing FSP number.

6. The method of claim 5, wherein the memory dies in the sequence are ordered randomly with increasing FSP number.

7. The method of claim 6, wherein the randomly generated sequence is based on random number generation within the controller.

8. The method of claim 5, wherein the sequence of memory die with increasing FSP number in each of the fill orders are precomputed at runtime.

9. The method of claim 5, further comprising:
programming each FSP unit to the non-volatile semiconductor memory device according to a sequential fill order of increasing die number if the write data is received on a single data stream.

10. The method of claim 1, wherein a number of the plurality of fill orders stored in the controller corresponds to a maximum number of concurrent data streams supported by the SSD.

11. The method of claim 1, further comprising:
storing in the controller the plurality of fill orders in a look up table indexed by stream number.

12. The method of claim 11, further comprising:
retrieving a fill order from the plurality of fill orders by indexing into the look up table with (i) a stream number, or (ii) a randomly generated number.

13. A solid-state drive (SSD) comprising:
a non-volatile semiconductor memory device comprising a plurality of memory dies for storing data; and
a controller communicatively coupled to the non-volatile semiconductor memory device, the controller configured to:
receive one or more write commands containing write data from a host interface,
determine that write data associated with the one or more write commands is on a plurality of data streams, each data stream of the plurality of data streams having a stream number,
identify, in connection with processing the one or more write commands, a given stream of the plurality of streams having a corresponding stream number;
retrieve a fill order from a plurality of fill orders based on the corresponding stream number, the fill order specifying a sequence of memory dies of the plurality of memory dies in which to program the write data, and
program the write data to the memory dies in the sequence specified by the retrieved fill order.

14. The SSD of claim 13, wherein the plurality of memory dies in the non-volatile semiconductor memory device are logically organized into a plurality of superblocks each containing a plurality of stripes, and the retrieved fill order is used to program the write data in memory dies of each stripe within each superblock.

15. The SSD of claim 14, wherein a new fill order is retrieved from the plurality of fill orders for each superblock.

16. The SSD of claim 15, wherein the controller is further configured to:
retrieve a fill order from the plurality of fill orders by using a precomputed rotation of the plurality of fill orders (i) per data stream, or (ii) per stripe, or (iii) per superblock.

17. The SSD of claim 13, wherein the write data is programmed in full-sequence-program (FSP) units each having an FSP number, and each fill order specifies a memory die for each FSP number, the sequence of memory die in each fill order arranged with increasing FSP number.

18. The SSD of claim 17, wherein the memory dies in the sequence are ordered randomly with increasing FSP number.

19. The SSD of claim 17, wherein the controller is further configured to:
program each FSP unit to the non-volatile semiconductor memory device according to a sequential fill order of increasing die number if the write data is received on a single data stream.

20. The SSD of claim 13, wherein the controller is further configured to:
retrieve a fill order from the plurality of fill orders by indexing into a look up table with (i) a stream number, or (ii) a randomly generated number.

* * * * *